United States Patent
Kuhn et al.

(10) Patent No.: US 11,014,449 B2
(45) Date of Patent: May 25, 2021

(54) METHOD AND DEVICE FOR DISPLAYING INFORMATION, IN PARTICULAR IN A VEHICLE

(75) Inventors: Mathias Kuhn, Berlin (DE); Rainer Dehmann, Berlin (DE); Frank Hauschild, Berlin (DE)

(73) Assignee: VOLKSWAGEN AG, Wolfsburg (DE)

( * ) Notice: Subject to any disclaimer, the term of this patent is extended or adjusted under 35 U.S.C. 154(b) by 2014 days.

(21) Appl. No.: 13/122,554

(22) PCT Filed: Sep. 22, 2009

(86) PCT No.: PCT/EP2009/062280
§ 371 (c)(1),
(2), (4) Date: Jun. 20, 2011

(87) PCT Pub. No.: WO2010/037671
PCT Pub. Date: Apr. 8, 2010

(65) Prior Publication Data
US 2011/0239161 A1    Sep. 29, 2011

(30) Foreign Application Priority Data

Oct. 2, 2008    (DE) .................... 10 2008 050 365.7

(51) Int. Cl.
*B60K 37/06*    (2006.01)
*B60K 35/00*    (2006.01)
*G06F 3/0482*   (2013.01)

(52) U.S. Cl.
CPC .............. *B60K 37/06* (2013.01); *B60K 35/00* (2013.01); *G06F 3/0482* (2013.01);
(Continued)

(58) Field of Classification Search
CPC .............................. B60K 37/06; B60K 35/00; B60K 2370/1438; B60K 2370/143; B60K 2370/161; G06F 3/0482
(Continued)

(56) References Cited

U.S. PATENT DOCUMENTS 5,736,974 A    4/1998  Selker
6,769,320 B1   8/2004  Bollgohn et al.
(Continued)

FOREIGN PATENT DOCUMENTS

DE    199 41 955    3/2001
DE    100 01 988    7/2001
(Continued)

OTHER PUBLICATIONS

International Search Report, issued in corresponding International Application No. PCT/EP2009/062280.
(Continued)

*Primary Examiner* — Andrey Belousov
(74) *Attorney, Agent, or Firm* — Hunton Andrews Kurth LLP

(57) ABSTRACT

In a method for displaying information, in particular in a vehicle, a list of multiple graphic objects is graphically represented on a display, a display area of the display being associated with each represented graphic object and the objects being selectable for executing a function. Prior to the selection of one of the objects, an animation runs in the display area of at least one graphic object, which illustrates the function associated with the graphic object.

11 Claims, 2 Drawing Sheets

(52) U.S. Cl.
CPC .............................. *B60K 2370/143* (2019.05); *B60K 2370/1438* (2019.05); *B60K 2370/161* (2019.05)

(58) Field of Classification Search
USPC ........................................................ 715/825
See application file for complete search history.

(56) References Cited

U.S. PATENT DOCUMENTS

| | | | | |
|---|---|---|---|---|
| 7,137,135 | B2 * | 11/2006 | Schein | ............... H04N 5/44543 |
| | | | | 348/E5.105 |
| 7,474,309 | B2 * | 1/2009 | Kolpasky | ................ G09F 21/04 |
| | | | | 340/441 |
| 7,653,882 | B2 * | 1/2010 | Horentrup et al. | ........... 715/821 |
| 8,527,896 | B2 * | 9/2013 | Matthews | ............. G06F 3/0482 |
| | | | | 715/711 |
| 2001/0052912 | A1 | 12/2001 | Ishii et al. | |
| 2003/0055537 | A1 * | 3/2003 | Odinak | ................ G01C 21/367 |
| | | | | 701/1 |
| 2005/0091609 | A1 | 4/2005 | Matthews et al. | |
| 2006/0215987 | A1 | 9/2006 | Horentrup et al. | |
| 2007/0261006 | A1 | 11/2007 | Reissmueller et al. | |
| 2008/0077863 | A1 * | 3/2008 | Jong | ........................ G06F 3/048 |
| | | | | 715/277 |
| 2008/0158190 | A1 | 7/2008 | Waeller et al. | |

FOREIGN PATENT DOCUMENTS

| | | |
|---|---|---|
| DE | 100 58 244 | 5/2002 |
| DE | 103 03 792 | 8/2004 |
| DE | 103 05 341 | 8/2004 |
| DE | 10 2004 048 956 | 4/2006 |
| EP | 1 212 208 | 6/2002 |
| EP | 1 932 727 | 6/2008 |
| JP | H03214220 A | 9/1991 |
| JP | H06-324835 A | 11/1994 |
| JP | 2002-007040 A | 1/2002 |
| WO | WO 01 46790 | 6/2001 |
| WO | WO 2007/094894 | 12/2006 |
| WO | 2007/094894 A2 | 8/2007 |

OTHER PUBLICATIONS

Written Opinion, issued in corresponding International Application No. PCT/EP2009/062280.

Response to Notification filed in corresponding European Patent Application No. 09783295.0.

* cited by examiner

METHOD AND DEVICE FOR DISPLAYING INFORMATION, IN PARTICULAR IN A VEHICLE

FIELD OF THE INVENTION

The present invention relates to a method for displaying information, in which a list of multiple graphic objects is graphically represented on a display, a display area of the display being assigned to each represented graphic object and the objects being selectable for executing a function. Furthermore, the present invention relates to a device for displaying information having a display for the graphical representation of information, a control unit, which is able to produce graphics data, which graphically represent at least one list of multiple graphic objects on the display, a display area of the display and a function being associated with each represented graphic object, and an input device for selecting an object shown on the display. In the method and using the device, information is displayed in particular in a vehicle. In this case, the display is mounted in the vehicle.

BACKGROUND INFORMATION

There are various information and communication areas in a motor vehicle to which display instruments are assigned. They are provided to inform the driver and the passengers. Furthermore, they can assist the driver in navigation or communication with the outside world. In particular, the display can visually represent traffic-related or operational data of the vehicle. The so-called instrument cluster is disposed near the driver's primary visual field. It is typically located in the cockpit behind the steering wheel and is visible through an opening in the steering wheel. In particular, it is used to indicate the speed, the fuel level, radiator temperature and other operation-related information of the motor vehicle. Additionally, radio and other audio functions may also be represented. Finally, it is possible to show menus for telephone, navigation, telematic services and multi-media applications. Liquid crystal displays of different designs are typically utilized as displays.

DE 100 01 988, for instance, describes an instrument cluster for displaying data relating to operation and/or traffic. To be better able to accommodate the manifold information, DE 103 03 792 provides for a perspective representation of three-dimensional elements.

As an additional display device, a vehicle frequently has a multifunction display in the center console or above the center console. Such a display for a multifunction operating element is described for example in DE 199 41 955.

Hierarchical menu structures are often used to display the manifold operating and display options in a clearly laid out manner.

The menu items of a menu are often represented in the form of a list based on graphic objects. When one of the represented graphic objects is selected, then the function associated with the corresponding menu item is executed. This function may also include the display of a submenu with additional submenu items.

Using such lists of selectable graphic objects in a vehicle poses the problem that registering the information shown by the display, such as the association of a desired function with a displayed graphic object, requires the diver's attention such that the driver becomes distracted from driving the vehicle. It is therefore desirable to represent the information in the vehicle such that it may be registered quickly and intuitively by the driver such that the apprehension of the represented information does not result in a distraction of the driver while driving. Furthermore, it should be possible to perform the operation in such an intuitive, simple and quick manner that the driver is able to operate the devices of the vehicle, the information of which is represented on the display device, even while driving. The representation of information and the operation associated with a representation of information in the motor vehicle thus contributes to safety when driving the motor vehicle.

SUMMARY

Example embodiments of the present invention provide a method and a device of the type mentioned at the outset, in which the represented information is apprehensible as quickly and intuitively as possible and which allows for a quick, intuitive and simple operation particularly of vehicle devices, the information of which is displayed.

The method according to example embodiments of the present invention is characterized by the fact that prior to the selection of one of the objects, an animation runs in the display area of at least one graphic object, which illustrates the function associated with the graphic object.

When a multitude of graphic objects are simultaneously represented on the display e.g. in a vehicle, the static display of an icon, i.e. of an image and/or text element, at times cannot be apprehended quickly enough by the driver while driving. The display of an animation according to example embodiments of the present invention, which is associated with the graphic object, has the effect that the function associated with the object may be recognized more intuitively and more quickly by the driver.

In a vehicle, there is furthermore the particular circumstance that due to the space conditions in the interior of the vehicle the displays used are normally relatively small. If multiple graphic objects of a list are shown on the display, then the display area associated with a graphic object is often very small, which further hampers the recognizability of the informational content of the graphic representation. In this case as well, the playback of an animation associated with the object makes it possible for the observer to recognize the function associated with the object more quickly and more intuitively.

It should be noted that the display areas associated with the objects are not static, but variable. The objects may be geometrically arranged in manifold ways on the display by user input or automatically. The size of the display area for an object may vary as well. The size of the playback of the animation depends in particular on the size of the display area that is associated with the object to which the animation belongs.

For which graphic objects animations may be run depends in particular on the functions that are associated with the respective graphic object. Preferably, animations run for all represented graphic objects in their respective display areas, which illustrate the function associated with the respective graphic object.

According to the method of an example embodiment of the present invention, the animation breaks off following the selection of a graphic object, and the function associated with the object is executed. The function associated with the object may also result in a change of the displayed image such that when executing the function the graphic object is not longer displayed or is displayed in another position or in another size.

According to the method, the animation illustrates the function associated with the graphic object in that it shows, at least schematically, an image sequence, which corresponds to an image sequence that is shown when the object is selected. If the function for example is that in representing a two-dimensional object, the object is turned over from one side, on which certain information is displayed, to the other side, on which other information is displayed, then an image sequence of a rotation of the two-dimensional object is displayed in the display area of the graphic object. In particular, an image sequence is displayed in the animation, which produces the impression of a continuous movement for the observer. For this purpose, the image sequence contains a multitude of intermediate images.

The display of the animation for a graphic object takes a certain time interval. After the animation has run completely, it is preferably repeated continuously. This repetition of the animation is performed particularly for all graphic objects, for which an animation is displayed when showing the list.

The device for displaying information, in particular in a vehicle, is characterized by the fact that prior to the selection of one of the objects, the control unit is able to produce an animation in the display area of at least one graphic object, which illustrates the function associated with the graphic object. This animation is run on the display when the list is displayed.

The input device may include for example a touch-sensitive surface of the display (touch screen). Furthermore, the input device may include an operating element that is separate from the display.

Moreover, the input device may include a device for detecting and evaluating a gesture of a body part of a user, which is performed in front of the display. For this purpose, the input device may include in particular a receiving device, to which a signal from the body part of the user may be transmitted capacitively when the body part is in proximity of the receiving device. The position of the body part may be detected via this capacitive coupling. From the change of this position over time, a gesture of the user may be inferred. Furthermore, the input device may include an infrared light source or a receiver for reflected infrared light for detecting the gesture of the body part of the user. In this case as well, the position of the body part and its change over time are detected and interpreted as a gesture.

The animation or animations may be produced by the control unit itself. The manner in which the animation is produced may depend on vehicle parameters such as the speed of the vehicle. Furthermore, the control unit may be coupled with a memory, in which data are stored for the animation or animations. In this case, for producing the animation, the animation data are transmitted from the memory to the control unit, which uses them in producing the graphics data that are rendered on the display.

Example embodiments of the present invention will now be explained with reference to the drawing.

DETAILED DESCRIPTION

Figure 1:
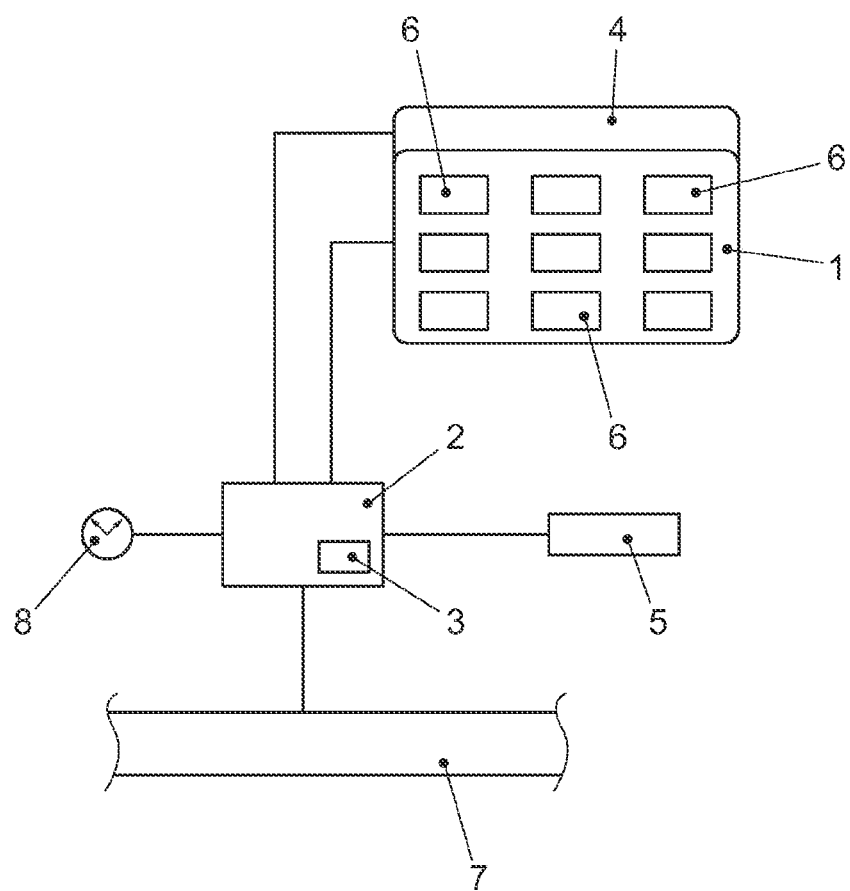
FIG. 1 shows schematically a device according to an example embodiment of the present invention and the connection of this device to other devices of the vehicle.

The exemplary embodiment described in the following relates to informational displays in a vehicle, in particular in a motor vehicle. In the same manner, however, example embodiments of the present invention may also be used in informational displays outside of a vehicle, e.g. in the display of information on a mobile device.

The display device includes a display 1 for the graphical representation of information. Display 1 may be a matrix display, e.g. an LCD (liquid crystal display), especially a color display using TFT (thin-film transistor) technology. Furthermore, the display may be a so-called twisted nematic-liquid crystal display (TN-LCD), a super twisted nematic (STN) display, a double-layer STN, an FLC (ferroelectric liquid crystal) display or an SSFLC (surface stabilized ferroelectric liquid crystal) display. Display 1 has an associated back-lighting (not shown), which may be provided by one or more light-emitting diodes. Display 1 is freely programmable, i.e. any desired graphics data may be produced, which are represented on display 1.

In particular, display 1 is mounted in an area of the vehicle that is clearly visible at least for the driver. If the operator control of the devices of the vehicle is directly coupled to the placement of the display, so that, for example, the user must bring his hand or his finger at least into the vicinity of display 1 in order to make inputs, then display 1 is positioned such that the driver of the vehicle may easily reach it with his hand or his finger. For instance, display 1 may be accommodated in the center console of the vehicle.

Display 1 is connected to a control unit 2, which is able to produce graphics data for graphic objects displayable on display 1. Control unit 2 is also connected to an input device 4, via which the user is able to control devices of the vehicle, the information of which is shown on display 1.

For example, input device 4 may be a device for detecting and evaluating a gesture of a body part of a user. For instance, the hand of the user may perform the gesture in front of display 1. For this purpose, the three-dimensional position of the hand is detected in a specific detection area in front of display 1, without it being necessary to touch display 1. The admissible detection area depends on the placement of display 1 in the motor vehicle. The area should be selected in such a way that the presence of the hand of a user in this detection area may be associated unequivocally with an operative control of input device 4. The boundary of the detection area may be e.g. 40 cm to 10 cm in front of display 1. If the hand of the user is brought up closer than this threshold value to display 1, this is detected by input device 4, and the approach is interpreted as an operating intention. For instance, this may result in a change in the manner the objects represented on display 1 are rendered. Input device 4 detects the position and the movement of the hand of the user in the detection area. In the process, various gestures performed by the hand are recognized and interpreted as inputs.

Input device 4 may include e.g. infrared light sources and infrared light receivers, which detect the infrared light reflected by the hand. Details of such an input device are described in DE 100 58 244, the respective disclosed content of which is hereby incorporated by reference. Further input devices, which may be used in conjunction with the display device, are described in the following publications: DE 103 05 341 and DE 10 2004 048 956.

Furthermore, the position of the hand and its change over time may also be detected by an optical system. In this system, a light-emitting diode emits e.g. square-wave, amplitude-modulated light. This light is reflected by the object to be detected, i.e. the hand, and after the reflection reaches a photodiode. Another light-emitting diode likewise emits square-wave, amplitude-modulated light to the photodiode, which light is phase-shifted by 180° however. At the photodiode, the two light signals are superposed and cancel each other out if they have exactly the same amplitude. If the signals do not cancel each other out at the photodiode, the light emission of the second diode is regulated via a control loop in such a way that the total received signal again adds up to zero. If the position of the object changes, this also causes a change in the light component which arrives at the photodiode from the first light-emitting diode via the reflection on the object. This brings about a correction of the intensity of the second light-emitting diode through the control loop. The control signal is therefore a measure for the reflection of the light, which is emitted by the first diode, on the object. In this manner, it is possible to derive from the control signal a signal that is characteristic for the position of the object.

In addition, the input device may be a touch-sensitive film, which is provided on display 1. The film makes it possible to detect the position at which the user touches display 1 situated behind the film. The film may be developed e.g. as a resistive touch film, a capacitive touch film or piezoelectric film. Furthermore, the film may be developed so as to measure a heat flow emanating e.g. from the finger of a user. Various inputs may be obtained from the development of the touch of the film over time. In the simplest case, for example, a touch of the film at a specific position may be allocated to a graphic object shown on display 1. Furthermore, sliding movements of the finger over the film may be interpreted. In particular, in this manner the user is able to define a line on display 1, in that he touches the film at one point, slides on the film toward another point and removes the finger from the film at the other point.

Finally, a separate operating element may be used as input device. In particular, the separate operating element is a mechanical operating element. For instance, a rotary switch may be provided, by which objects shown on the display are controllable and are selectable by pressing the rotary switch. Furthermore, an angle of rotation may also be input directly by the rotary switch, as will be explained later. In addition, separate press switches may be disposed around the rotary switch, the arrangement of display fields on the display, which are associated with the press switches, corresponding at least schematically to the arrangement of the press switches.

The informational system according to the present invention may include a multifunction operating device as described in EP 1 212 208 for example.

Control unit 2 is further coupled to a system clock 8 and to a vehicle bus 7. Control unit 2 is connected to driver assistance systems of the vehicle via vehicle bus 7. Control unit 2 receives data from these driver assistance systems via vehicle bus 7, and prepares these data so that they are displayed graphically to the driver or the vehicle occupants via display 1. To this end, control unit 2 produces graphics data for objects displayable on display 1, which, inter alia, graphically represent the information of the driver assistance systems. Control unit 2 is furthermore connected via vehicle bus 7 to various information, communication and entertainment devices of the vehicle. The varied information from these devices of the vehicle is processed in control unit 2 and converted into graphics data for a graphical representation. For animations of the graphical representation on the display, the control unit includes an computing unit 3, which accesses system clock 8 in producing intermediate images.

In the following, the display of information on display 1 in the vehicle is explained in detail:

Display 1 represents a list having multiple graphic objects 6. The list may be part of a menu for example. Display 1 may graphically represent either all objects 6 of the list or only some of the objects 6 of the list. Each represented graphic object 6 has an associated display area on the display. The size of the display area depends particularly on the size of display 1 and on the number of graphic objects 6 to be represented. As described above, graphic objects 6 are selectable via input device 4 for executing a function associated with graphic object 6.

Prior to selecting one of objects 6, an animation runs in the display area of at least one graphic object 6, which illustrates the function associated with the graphic object. The animation runs within the window that is formed by the display area of the associated graphic object 6.

Figure 2A:
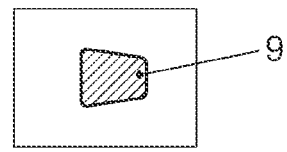
FIGS. 2A-2D illustrate an animation for a graphic object of the list, which is rendered on the display.
Figure 2B:
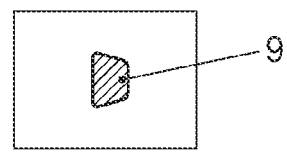
Figure 2C:
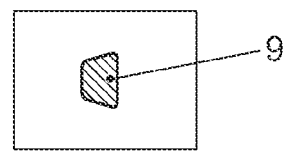
Figure 2D:
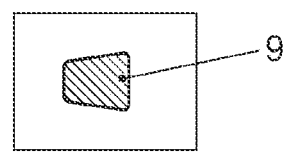

In the following, an animation is explained with reference to FIGS. 2A through 2D, which runs in the display area of a graphic object 6, which is associated with a function that results in a rotation of a two-dimensional graphic object. This function is illustrated in the animation in that a two-dimensional object is rotated in perspective by 180°. An image sequence with numerous intermediate images is shown in the animation, which creates the impression of a continuous rotation for an observer. FIGS. 2A through 2D show some of the intermediate images of the animation. In the process, object 9, which is shown within a subsection of the display area of graphic object 6, is rotated about a vertical axis. At the beginning of the rotation, the vertical axis coincides with the right vertical lateral edge of object 9. In the course of the rotation, the vertical axis is shifted in the horizontal direction from the right edge of the subsection of the display area of object 6 to the left edge of the subsection of the display area of object 6. At the same time, object 9 is rotated about the vertical axis, as is shown in FIGS. 2A through 2D. After a rotation by 180°, the vertical axis is situated on the left edge of the subsection of the display area of object 6. In the process, the horizontal shift of the vertical axis is synchronized in a linear manner with the rotation of graphic object 9.

LIST OF REFERENCE NUMERALS 1 display
2 control device
3 computing unit
4 input device
5 memory
6 graphic object
7 vehicle bus
8 system clock
9 object

The invention claimed is:

1. A method for displaying information, comprising:
graphically displaying in a display a list of multiple graphic objects, each represented graphic object having an associated display area on the display, and the objects being selectable for executing a function;
prior to selecting one of the objects, simultaneously running an animation in each of the display areas, each animation illustrating the function associated with the graphic object in the display area of the animation, wherein each animation illustrates the function associated with the graphic object in the display area of the animation, in that it shows, at least schematically, an image sequence corresponding to an image sequence that is shown when the object is selected; and
following selection of the one of the objects, ending the simultaneously running animations and executing the function associated with the selected object;

wherein the display is arranged in a vehicle, and further wherein at least one of the animations displayed prior to selecting one of the objects, depends on a vehicle speed.

2. The method according to claim 1, wherein animations run for all represented graphic objects in their respective display areas to illustrate the function associated with the respective graphic object.

3. The method according to claim 1, wherein an image sequence is displayed in the animation, which creates an impression of a continuous movement for the observer.

4. The method according to claim 1, wherein the animation is shown repeatedly in succession.

5. A device for displaying information, comprising:
a display adapted for graphical representation of information;
a control unit adapted to produce graphics data, which graphically represent at least one list of multiple graphic objects on the display, each represented graphic object having an associated display area on the display and function; and
an input device adapted to select an object shown on the display;
wherein the control unit is adapted to produce, prior to selection of one of the objects, a simultaneous display of an animation in each of the display areas, each animation illustrating the function associated with the object in the display area of the animation, wherein each animation illustrates the function associated with the graphic object in the display area of the animation in that it shows, at least schematically, an image sequence corresponding to an image sequence that is shown when the object is selected;
wherein, following selection of the one of the objects, the control unit is further adapted to end the simultaneous animations and execute the function associated with the selected object;
wherein the display is arranged in a vehicle, and further wherein at least one of the animations displayed prior to selecting one of the objects, depends on a vehicle speed.

6. The device according to claim 5, wherein the input device includes a touch-sensitive surface of the display.

7. The device according to claim 5, wherein the input device includes an operating element that is separate from the display.

8. The device according to claim 5, wherein the device includes a memory coupled to the control unit and adapted to store data for the animation.

9. The device according to claim 5, wherein the device is adapted to perform the method recited in claim 1.

10. The method according to claim 1, wherein the method is performed by the device recited in claim 5.

11. The method according to claim 1, wherein the object is selected in response to a gesture of a body part in front of the display without touching the display.

* * * * *